3,106,452
METHOD FOR REDUCING THE SODA CONTENT OF ALUMINA
David R. Watson and Alfred Lippman, Jr., Benton, and Damon V. Royce, Jr., Pulaski County, Ark., assignors to Reynolds Metals Company, Richmond, Va., a corporation of Delaware
No Drawing. Filed May 18, 1960, Ser. No. 29,825
16 Claims. (Cl. 23—142)

This invention relates to friable alumina and to the method of its preparation. More particularly, the invention concerns a low soda content, high-alpha alumina of very small ultimate crystal size, heretofore unobtainable, and its preparation by heating ordinary alumina, which may contain or may not contain chemically combined water, in the presence of a small proportion of discrete material containing a substantial proportion of silica, and capable of combining with soda.

Alumina having a very small ultimate crystal size and which is low in soda content is extremely important for many ceramic and other high temperature applications, including, for example, spark plug and other insulators, vacuum tube supports and coatings for jet engine combustion chamber, nozzle and turbine blades. Commercial grades of low soda alpha alumina currently available contain alpha alumina crystals having an ultimate crystal size ranging from about 2 to 15 microns, with soda contents of the order of 0.03% to 0.10% $Na_2O$.

Small ultimate crystal size is important in ceramic uses because the aluminas generally can be comminuted into ultimate crystals by ball milling or by fluid energy milling, but because of their toughness, hardness, and abrasiveness, the ultimate crystals cannot be readily broken up. In ceramic applications a wide range of small particle sizes is beneficial in respect to physical strength in fired products, but such a range has not been available prior to the present invention and the available commercial grades of alumina have been characterized by relatively large and uniform crystals which are not conducive to the development of the highest ultimate strength in ceramic products, particularly products requiring low soda and high alpha alumina content.

Various methods have been proposed to achieve a low soda content in alumina, including treatment with aluminum fluoride, heating under high vacuum, and calcination with boric oxide. In the boric oxide treatments, the boron and soda compounds are removed in gases discharging from the kiln through vaporization of these solids. The borate soda removal process has been shown by experience to possess numerous disadvantages. Control of the process is difficult because the borate volatilizes in the hot zone of the kiln, is carried to the cold end by the kiln gases, and condenses there to impose a heavy recycling load within the kiln. Moreover, the boric oxide is costly, the alumina product is contaminated with additional impurities since some boron remains behind, and there is attack on most kiln fire-clay brick. Ordinarily it is not possible to achieve a soda content less than about 0.03% $Na_2O$ by the boric oxide method. Neither is it possible to attain the desirable small ultimate crystal size, since boric oxide is a mineralizing agent which promotes crystal growth in alumina resulting in alpha alumina crystals in sizes upward of 2 microns, tending to yield ceramic products of insufficient flexural strength. Further, the fine dust into which the boron additive and the soda are converted in the discharge gases, constitutes a pollution and disposal problem.

In accordance with the present invention, it has been found that friable high alpha alumina of very small ultimate crystal size and low soda content can be prepared by heating ordinary alumina at elevated temperatures with a material containing a substantial proportion of silica. It has been found that any siliceous material capable of reacting with soda, or any free silica containing material, has the effect of removing soda from the alumina crystal lattice at elevated temperatures, so that by heating in accordance with this invention there is produced an almost soda-free high alpha alumina product having unique favorable properties of small ultimate crystal size, friability, flowability, high bulk density, and shrinkage conducive to high density ceramic bodies. All these properties are of importance in ceramic and other applications.

For the preparation of the novel friable alumina of this invention, any suitable form of soda-containing aluminum oxide, calcined or hydrated, and possessing varying degrees of burn, purity, crystallinity and hydration, may be used as a starting material. While somewhat greater effectiveness is enjoyed when starting the heating with alumina hydrate, nevertheless the use of substantially dehydrated alumina has the advantage of obviating the troublesome fluidization phase, especially in rotary calciners, of hydrate dehydration. When starting with conventional metallurgical grade calcined alumina, advantageously the alumina is first washed with from about 2 to 5 times its weight of water in order to remove as much soluble soda as possible prior to the heating with the silica containing material. The washing is preferably carried out with hot water, the water temperature being close to the boiling point.

The siliceous or silica containing material which is employed for treating the alumina in accordance with the invention is one which is capable of combining with soda and contains a substantial proportion of either pure or combined silica, generally ranging from substantially less than 10% $SiO_2$ to substantially pure 100% silica, and preferably will not disintegrate upon being heated. The silica may be present in pure or nearly pure form, as in quartzite or high silica sand, or in the form of a metal silicate, such as a silicate of an alkaline earth metal, such as Ca, Ba, Sr, or of magnesium, or of aluminum. Many materials which contain aluminum silicate may be used, including porcelain, mullite, kiln brick, sillimanite, kyanite, nepheline syenite, calcined kaolin, and shale. Calcium silicate, as in the form of crushed concrete may also be used, as can magnesium silicate, like forsterite. Fused or sintered alumina refractory materials containing silica can also be employed for the purposes of this invention, such as for example, a fritted alumina containing 10% $SiO_2$. The latter has been found unusually effective in sodium removal despite its low silica content. In sintered aluminas containing minor amounts of silica, the alumina appears to act as a surface carrier for the silica, which is a binder. The effective sodium removal is believed to be due to the unusually large surface area of the SiO₂ dispersed throughout the porous sintered alumina body. It is preferred to use relatively pure silica as an agent for soda removal and transformation to very small ultimate crystal size. Silica of high purity in the form of quartzite or common graded sand is preferred because it has the advantages of being more concentrated in the active SiO₂ component and of not being readily crumbled by the heat of the reaction or by taking up the removed soda.

While applicants do not wish to be bound by any particular theory, it is believed that the mechanism of the reaction involves removal of soda from the alumina crystal lattice by vaporization of the soda, followed by reaction of the soda in the vapor phase with the solid silica present. The process of the present invention thus differs fundamentally from the boric oxide method of soda removal in that the silica present remains in the solid phase and combines with the soda vapor to form a new solid phase containing the soda, which is subsequently separated from the alumina. In the boric oxide method the soda and the sodium borate formed are removed as vapor. Consequently the present process provides a more economical procedure and an unexpectedly superior product.

The process of this invention has the further advantage that contamination of the alumina with extraneous or harmful materials such as, for example, boron compounds, is avoided. The silica containing materials employed are low in cost and can be reused many times. Since the reaction product of soda and silica is a solid, it can be separated from the friable alumina product by simple screening or other conventional methods of solids separation. The silica containing material actually protects the brick lining of the kiln against soda attack by reacting preferentially with the soda vapors. The final product into which the silica is converted, consisting largely of sodium silicate or sodium aluminum silicate, when silica or aluminum silicate is used, is generally formed in particles of a size greater than that of the alumina. Thus there is not only no possibility of silicate dust contamination, but substantially complete separation is facilitated. Any very minor amounts of silica combined with soda that may remain are relatively unobjectionable in most ceramic products in which the resulting alumina may be used.

The quantity of material containing a substantial proportion of silica to be employed in treating the starting alumina will generally range between about 1% and about 20% by weight of the alumina, and preferably between about 3% and about 10%, but substantial variations may be made from these ranges, depending upon the materials being treated, the silica containing material being employed, the time of treatment, the temperature of heating, particle size, and other factors, and upon the end product desired.

The particle size of the alumina which is to be subjected to treatment is not critical. It may range from small lumps down to material retained on a 325 mesh sieve. Advantageously, however, the particle size of the alumina will range between about 50 mesh and about 325 mesh. As mentioned previously, the alumina is preferably washed with hot water prior to treatment with silica in order to remove soluble soda present.

The particle size of the silica containing treating agent is of importance in that the smaller the particle size, the greater will be the exposed surface of the silica, and the greater the surface area of exposed siliceous material the more rapid is the rate of soda removal. This is evidenced by the greater effectiveness in small ultimate crystal size (crystallite) formation and in sodium removal afforded by reduction in screen size of the silica containing treating agent. Thus 4 x 6 mesh quartzite does not provide as much effective silica surface for soda removal as 10 x 14 mesh quartzite. Particularly favorable results were obtained using quartzite of 20 x 30 mesh size, which when added to metallurgical alumina and heated therewith in an amount of 5% by weight, reduced the soda to an extremely low content of 0.02%, while simultaneously increasing the alpha alumina content to 95% or higher.

In accordance with the invention, alumina in any desired form is heated with or in presence of a material containing a substantial proportion of silica at a temperature above about 2100° F. and within upper limit of temperature at which there occurs excessive softening or fusion of the alumina or of the silica containing material or both, causing a bonding together which would substantially interfere with the ready separation of the treated alumina and the siliceous component. The preferred temperature range for treatment lies between about 2300° F. to about 2800° F. A temperature range of about 2400° F. to about 2750° F. has been found satisfactory for most purposes.

The alumina being treated and the siliceous material are preferably uniformly blended, but this is not necessarily an absolute requirement, for it has been found that by reason of the volatilization of the soda, the siliceous material can be at a substantial distance from the alumina and still absorb the soda vapor.

The absorption of the soda by the siliceous material is manifested by changes in appearance and properties of the latter. Thus, porcelain deteriorates and becomes brittle. Quartzite changes its appearance from virtually colorless smooth translucent pieces to white opaque relatively rough surfaced pieces as the heating progresses, becomes more friable and easily broken than the original tough and strong quartzite. Nevertheless, the final soda containing quartzite remains virtually intact and sufficiently firm to permit easy separation from the alumina.

The heating of the alumina and the siliceous material will be carried out at the temperature range indicated previously for any desired period of time, depending upon the calcination temperature, the degree of reduction of soda content sought, the proportion of alpha alumina to be achieved, the crystallite sizes desired, the atmosphere during heating, and other objectives. In general, the heating may be carried on for about ½ to 2 hours, and it has been found that heating for about 1 hour gives generally satisfactory results. Shorter periods are generally more adequate for soda removal alone than for alpha phase development.

The heating of the alumina and the siliceous material may be performed in any suitable type of apparatus, as for example a rotary kiln. The feed of siliceous material is preferably but not necessarily coarser than the alumina, so that it can be readily separated from the kiln discharge by screening or other suitable methods, and reused. Besides screening, the alumina can be separated from the siliceous material particles by methods based on differences in specific gravity, electrostatic susceptibility, and the like. The density of quartzite is less than that of alumina, thus avoiding segregation of larger quartzite packages in the bottom of the kiln.

The unique characteristic of the treated alumina is its very small ultimate crystal size, as well as its extremely low soda content. Thus the novel alumina of this invention provides a new low level of crystallite sizes, enabling the production of denser and stronger ceramic objects. For example, the friable alumina of this invention produces a very much denser fired ceramic body than is possible with commercially available low-soda aluminas, with a corresponding improvement in flexural strength. In contrast to the soda contents of the order of 0.03% to 0.10% of hitherto available aluminas, and to their large and relatively uniform crystals, ranging from 2 microns upward, the alumina of the present invention will contain as little as 0.004%, but generally less than 0.10% downward to 0.02% $Na_2O$ or less, and contains ultimate crystals preponderantly below 2 microns in size, with a large proportion of the individual crystals of fractional micron size. Thus, the alumina of this invention permits extension of the size range previously available, and at the same time provides a wide range of ultimate crystal size within itself.

The preparation of the novel friable aluminas of this invention and the effectiveness of the process in soda removal is illustrated by the following examples and in Table 1, but the invention is not to be considered as limited in any way thereby.

EXAMPLE 1

Silica Treatment of Washed Alumina 1 lb. of regular metallurgical grade alumina containing 0.36% $Na_2O$ and 15–20% alpha alumina was washed with 2.8 lbs. of water for 28 minutes at 210° F. to remove soluble soda. The soda removed by the washing was 0.10% $Na_2O$, leaving a soda content of 0.26%. The washed alumina, having alumina, having a particle size averaging about 150 mesh, was uniformly mixed with 10% by weight of Canadian quartzite containing 99+% $SiO_2$, of 10 x 14 mesh size, and the mixture was placed in a platinum dish and the dish was placed in a cold globar muffle furnace. The temperature was raised to 2750° F. during the course of about 2¼ hours. Heating was continued at 2750° F. for a retention time of 1 hour, after which the furnace was allowed to cool and the dish removed. The quartzite was separated from the alumina by screening on a 35 mesh screen. The soda content of the alumina was found to be 0.02%, as determined by the spectrographic method. On the basis of microscopic analysis, the alpha alumina content was estimated to be 90–95%, and the crystallite size was predominantly below 2 microns. The percentage of $Na_2O$ in the quartzite rose from an original 0.03% to 1.35%.

Comparison tests with the same starting material as a control, and with no addition of silica containing material, indicated that with both unwashed and washed alumina, no appreciable reduction in soda content occurred with heating alone, the only change being a normal increase in the alpha alumina content to 65–70%, a level characteristically developed by the temperature employed.

EXAMPLE 2

Effect of Silica Screen Size

Using the same washed metallurgical alumina starting material and the same conditions of treatment as described in Example 1, to demonstrate the effect of screen size of the quartzite, and of variations in percentage of treating agent, a series of tests was made which may be summarized as follows:

TABLE 1

| Percent quartzite added | Screen size (mesh) | Starting alumina | | Treated alumina | |
|---|---|---|---|---|---|
| | | Percent alpha | Percent $Na_2O$ | Percent alpha | Percent $Na_2O$ |
| 5 | 4 x 6 | 15–20 | 0.26 | 80–85 | 0.09 |
| 5 | 10 x 14 | 15–20 | 0.26 | 85–90 | 0.03 |
| 10 | 4 x 6 | 15–20 | 0.26 | 90–95 | 0.04 |
| 10 | 10 x 14 | 15–20 | 0.26 | 90–95 | 0.02 |

It was desired to determine the effect of using a harder burnt alumina (with 30–34% alpha and 0.44% $Na_2O$). Washing in the same way resulted in a higher soda content of 0.38% $Na_2O$ instead of 0.26%. Calcining with 10% quartzite gave the following results:

TABLE 2

[Firing temp., 2750° F.; retention time, 1½ hrs.; metallurgical alumina (prior to washing) $Na_2O$ (percent), 0.44]

| Name | Starting alumina | | Saline County (Ark.) quartzite added | | Alumina product | |
|---|---|---|---|---|---|---|
| | $Na_2O$, percent | Alpha, percent | Mesh | Weight percent | Percent $Na_2O$ | Percent alpha |
| Washed met. $Al_2O_3$ | 0.38 | 30–40 | 4 x 6 | 10.0 | 0.12 | 85–89 |
| Washed met. $Al_2O_3$ | 0.38 | 30–34 | 10 x 14 | 10.0 | 0.07 | 85–89 |

This compared (Table 1) with 0.04 and .02% respectively when the washed 0.26% $Na_2O$ alumina was used.

Therefore, the higher burn and higher alpha content of starting material resulted in less extraction of the soda by washing, and in a higher final soda content after calcination with quartzite.

However, it was further found that use of only 5% of quartzite of smaller particle size, 20 x 30 mesh, readily permitted reduction of soda to 0.02% $Na_2O$ irrespective of burn or soda content in starting alumina.

EXAMPLE 3

Effect of Re-Use of Silica

Using the same metallurgical alumina and quartzite as in Example 1, the effect in terms of soda removal, alpha alumina content, and density of the finished product, of re-use of the quartzite in a series of 4 firings, using two different mesh sizes of quartzite, is summarized in the following Table 3. Density was measured by standard pycnometer method using kerosene. The coarse quartzite did not produce as low a soda content as the finer quartzite. The finer quartzite was as effective after use for 4 firings as it was initially. The siliceous material after the last firing was a soda-containing amorphous glass with a small proportion of alumina.

TABLE 3.—EFFECTIVENESS OF QUARTZITE ON REMOVAL OF SODA, ALPHA CONVERSION AND DENSITY ON CYCLIC FIRING WITH WASHED METALLURGICAL ALUMINA

[Firing temp., 2750° F.; retention time, 1½ hrs.]

1st Firing (Using Washed Met. $Al_2O_3$)

| Treatment | Alumina product | | |
|---|---|---|---|
| | $Na_2O$, percent | Density, gm./ml. | Alpha, percent |
| 10% 4 x 6 mesh (by weight) fresh quartzite | 0.04 | 3.94 | 90–95 |
| 10% 10 x 14 mesh (by weight) fresh quartzite | 0.02 | 3.94 | 90–95 |

2nd Firing (Using Fresh Washed Met. $Al_2O_3$)

| 10% 4 x 6 mesh (by weight) quartz. from 1st firing | 0.07 | 3.94 | 85–90 |
| 10% 10 x 14 mesh (by weight) quartz. from 1st firing | 0.02 | 3.97 | 90–95 |

3rd Firing (Using Fresh Washed Met. $Al_2O_3$)

| 10% 4 x 6 mesh (by weight) quartz. from 2nd firing | 0.08 | 3.94 | 85–90 |
| 10% 10 x 14 mesh (by weight) quartz. from 2nd firing | 0.03 | 3.96 | 90–95 |

4th Firing (Using Fresh Washed Met. $Al_2O_3$)

| 10% 10 x 14 mesh (by weight) quartz. from 3rd firing | 0.02 | ......... | 90–95 |

The effectiveness of various other siliceous materials on soda removal and alpha alumina conversion, using the same starting metallurgical grade alumina, either unwashed where so indicated, or washed as described in Example 1, is indicated by the data in following Table 4. The same 2750° F. firing temperature for 1½ hours was employed.

Table 4 shows the effectiveness of a wide range of silicates in addition to silica itself, and that silica and the aluminum silicates are more effective than other silicates. The effect of concentration of silica in the siliceous material is illustrated by the lesser effectiveness of Alundum. The Alundum consists principally of alpha alumina with silica present chiefly as mullite, an aluminum silicate ($1.5Al_2O_3 \cdot SiO_2$). The lower silica content of the Alundum (only about 10%) makes it less effective for this purpose. Table 4 further confirms that, both using quartzite and Alundum as treating agents, an unwashed alumina will not respond as well as a washed alumina.

TABLE 5
[3 hrs. at 2750° F.]

| Siliceous material used | Prior to firing | | | After firing | | |
|---|---|---|---|---|---|---|
| | Siliceous material—$Na_2O$, percent | $Al_2O_3$ balls—$Na_2O$, percent | Total soda input, gms. | Siliceous material—$Na_2O$, percent | $Al_2O_3$ balls—$Na_2O$, percent | Total soda output gms. |
| Quartzite (20 x 30 mesh) | 0.033 | 0.39 | 0.028 | 0.21 | 0.24 | 0.021 |
| 50-50 mix quartzite (20 x 30 mesh) and alumina (0.004% $Na_2O$) | 0.033 | 0.39 | 0.028 | 0.28 | 0.19 | 0.020 |
| Sillimanite (20 x 30 mesh) | 0.50 | 0.39 | 0.037 | 0.72 | 0.20 | 0.028 |

NOTE.—$Al_2O_3$ balls fired over quartzite contained 0.24% $Na_2O$; whereas quartzite with $Al_2O_3$ admixed and sillimanite reduced soda in balls to 0.19% $Na_2O$ and 0.20% $Na_2O$ respectively.

*Effect of Other Process Variables*

Whereas the soda in starting alumina did affect final

TABLE 4.—EFFECTS OF SILICEOUS MATERIALS ON SODA REMOVAL AND ALPHA CONVERSION

| Name | Principal chemical components | Chemical analysis | | Percent added | Screen size (mesh) | Starting alumina | | Final alumina | |
|---|---|---|---|---|---|---|---|---|---|
| | | $Al_2O_3$, percent | $SiO_2$, percent | | | Percent alpha | Percent $Na_2O$ | Percent alpha | Percent $Na_2O$ |
| Quartzite (Arkansas) | Silica ($SiO_2$) | | | 10 | 4 x 6 | [1] 15-20 | 0.44 | 82-86 | 0.075 |
| Porcelain | Aluminum silicate (mullite, $3Al_2O_3 \cdot 2SiO_2$) and alpha alumina. | 26.70 | 56.45 | 10 | 4 x 6 | 15-20 | 0.26 | 85-90 | 0.04 |
| | | | | 10 | 10 x 14 | 15-20 | 0.26 | 85-90 | 0.03 |
| Kiln brick | Aluminum silicate sillimanite, $Al_2O_3 \cdot SiO_2$) and silica. | 44.38 | 51.33 | 10 | 4 x 6 | 15-20 | 0.26 | 80-85 | 0.12 |
| | | | | 10 | 10 x 14 | 15-20 | 0.26 | 85-90 | 0.06 |
| Kyanite | Aluminum silicate ($Al_2O_3 \cdot SiO_2$) | 63.0 | 37.0 | 10 | 4 x 6 | [1] 15-20 | 0.44 | 80-84 | 0.084 |
| Nepheline syenite | (Na,K) aluminum silicate ($NaAlSiO_4$) | 31.0 | 42.0 | 10 | 4 x 6 | [1] 15-20 | 0.44 | 82-86 | 0.064 |
| Calcined kaolin | Aluminum silicate ($Al_2O_3 \cdot 2SiO_2$) | 46.0 | 54.0 | 10 | 4 x 6 | [1] 15-20 | 0.44 | 83-87 | 0.052 |
| Sillimanite | Aluminum silicate ($Al_2O_3 \cdot SiO_2$) | 63.0 | 37.0 | 10 | 4 x 6 | [1] 15-20 | 0.44 | 83-87 | 0.073 |
| Shale | Silica | | 24.0 | 10 | 4 x 6 | [1] 15-20 | 0.44 | 84-88 | 0.13 |
| Kiln brick (Forsterite) | Magnesium silicate ($Mg_2SiO_4$) | | 42.0 | 10 | 4 x 6 | [1] 15-20 | 0.44 | 82-86 | 0.24 |
| Crushed concrete | Calcium silicate and silica | | | 10 | 4 x 6 | [1] 15-20 | 0.44 | 87-91 | 0.33 |
| Alundum | Alpha alumina (mullite) | 89.0 | 10.0 | 10 | 4 x 6 | 15-20 | 0.26 | 75-80 | 0.15 |
| Do | do | | | 10 | 10 x 14 | 15-20 | 0.26 | 85-90 | 0.07 |
| Do | do | 90.0 | 10.2 | 10 | 4 x 6 | [1] 15-20 | 0.44 | 85-90 | 0.21 |
| Do | do | | | 10 | 10 x 14 | [1] 15-20 | 0.44 | 85-90 | 0.18 |

[1] Alumina unwashed.

EXAMPLE 4

*Effect of Purity of Silica*

It was found that virtually pure silica (quartzite), aluminum silicate (sillimanite), and mixtures of quartzite with soda-free alumina, all effectively combined with soda vapor. The quartzite reacts slightly less rapidly than the other two materials. Thus, the presence of alumina in the siliceous materials appears to make the latter more effective in soda removal. Tests were conducted by exposing the siliceous material only to the soda vapors evolved from soda-containing alumina balls heated at 2750° F. There was no direct contact between the soda-containing alumina and the siliceous material, in order to demonstrate the enhancing of the action of the silica by alumina. In the reaction products, sodium aluminum silicate tends to form at a somewhat more rapid rate than the sodium silicate, indicating that the presence of alumina, whether free or combined, tends to accelerate the reaction with soda. The results are shown in the tests in Table 5.

soda content considerably when 4 x 6 or 10 x 14 mesh quartzite was employed, the use of 5% of finer 20 x 30 mesh quartzite reduced the $Na_2O$ content to 0.02% or less in all grades of aluminas tested as shown in the following Table 6:

TABLE 6.—EFFECTS OF STARTING ALPHA CONTENT ON SODA REMOVAL AND ALPHA CONVERSION IN PRODUCTION OF FRIABLE ALUMINA
[Firing temperature, 2750° F.; retention time, 1½ hrs.]

| Name | Starting alumina | | Saline County (Ark.) quartzite added [1] | Alumina product [2] | | |
|---|---|---|---|---|---|---|
| | Percent $Na_2O$ | Percent Alpha | | $Na_2O$, Percent | Alpha, Percent | $Na_2O$ removed, percent |
| Kiln feed hydrate | 0.35 | | 5.0 | 0.02 | 83-87 | 94.3 |
| Met. $Al_2O_3$ | 0.48 | 24-28 | 5.0 | 0.02 | 86-90 | 96.0 |
| Met. $Al_2O_3$ | 0.43 | 29-33 | 5.0 | 0.02 | 82-86 | 95.3 |
| Met. $Al_2O_3$ | 0.40 | 30-34 | 5.0 | 0.02 | 87-91 | 95.0 |
| Met. $Al_2O_3$ | 0.46 | 48-52 | 5.0 | 0.015 | 85-89 | 95.7 |
| Med. burn ceramic $Al_2O_3$ | 0.50 | 72-76 | 5.0 | 0.02 | 91-95 | 96.0 |
| High burn $Al_2O_3$ ceramic | 0.30 | 85-89 | 5.0 | 0.02 | 90-94 | 93.3 |

[1] Weight percent of 20 x 30 mesh.
[2] Crystallite size in all samples—predominately 2 microns and less.

In general, a somewhat higher alpha content is produced from a higher initial alpha content. It is apparent that 20 x 30 mesh quartzite is far more effective than the coarser meshes.

Somewhat better results were obtained with Canadian Manitoulin Island quartzite in the coarser sizes, but Table 7, below, shows that local Saline County, Arkansas, quartzite was equivalent to the Canadian quartzite in the 20 x 30 mesh size, and that 2–3% reduces the $Na_2O$ content to below the usual 0.10% specification, when used with unwashed metallurgical alumina, cf. Table 7, following:

TABLE 7

[Starting alumina—unwashed metallurgical (0.44% $Na_2O$); quartzite—Arkansas Saline County or Manitoulin Island (Canada) as designated; calcination temp., 2750° F.; retention time, 1½ hours]

| Quartzite | | $Al_2O_3$ product | | | |
|---|---|---|---|---|---|
| Type | 20 x 30 mesh added, weight percent | $Na_2O$, percent | Alpha alumina, percent | Crystallite size, microns | Product $SiO_2$, percent |
| Saline County | 0.25 | 0.32 | 84–88 | (1) | |
| Do | 0.50 | 0.26 | 84–88 | (1) | |
| Do | 1.00 | 0.24 | 84–88 | (1) | |
| Do | 3.00 | 0.06 | 86–90 | (1) | 0.05 |
| Do | 5.00 | 0.03 | 85–89 | (1) | 0.05 |
| Manitoulin Island | 0.25 | 0.29 | 84–88 | (1) | |
| Do | 0.50 | 0.28 | 82–86 | (1) | |
| Do | 1.00 | 0.21 | 85–89 | (1) | |
| Do | 3.00 | 0.05 | 87–91 | (1) | 0.04 |
| Do | 5.00 | 0.04 | 85–85 | (1) | 0.04 |

1 Predominantly 2 microns and smaller.

Using alumina hydrate instead of calcined metallurgical grade alumina, only .75–1% of quartzite is required for reduction to 0.05% $Na_2O$. It is apparent that the hydrate works better for soda removal but a little poorer for alpha content, than does calcined metallurgical alumina, as shown by comparison of Table 7 with Table 8, below:

TABLE 8

[Starting alumina—kiln feed hydrate (0.35% $Na_2O$ calcined basis); quartzite—Arkansas Saline County (20 x 30 mesh); calcination temperature, 2750° F.; retention time, 1½ hours]

| Weight percent,1 20 x 30 mesh quartzite | Alumina product | | |
|---|---|---|---|
| | $Na_2O$, percent | Alpha, percent | Crystallite size, microns |
| 0.25 | 0.26 | 82–86 | (2) |
| 0.50 | 0.21 | 83–87 | (2) |
| 1.00 | 0.05 | 85–89 | (2) |
| 3.00 | 0.02 | 84–88 | (2) |
| 5.00 | 0.005 | 83–87 | (2) |

1 Quartzite added in weight percent on calcined alumina basis.
2 Predominantly 2 microns and less. Considerably more 1-micron crystals than in friable from metallurgical $Al_2O_3$.

While the above data are based on a 1½ hour heating time, Table 9, below, shows that this interval could be greatly reduced to remove only the soda, but that an hour would be required to bring up alpha content, as well. In the 20 x 30 mesh size, Arkansas Saline County and Manitoulin Island quartzite perform about equally. Even as little as 0.25% of quartzite is effecitve in soda removal. Reduction to 0.10% $Na_2O$ or less would require about 2–3% of quartzite for unwashed metallurgical grade, about .75–1% quartzite for alumina hydrate (percent of quartzite based on calcined alumina weight). Obviously, the quartzite is more effective when added to hydrate than when added to metallurgical grade alumina.

*Effect of calcination time.*—Kiln feed hydrate with 0.35% $Na_2O$ and metallurgical alumina with 0.44% $Na_2O$ and 15–20% alpha, calcined with 10% Arkansas Saline County quartzite, 20 x 30 mesh, at 2750° F. for indicated period gave the result shown in Table 9:

TABLE 9

| Item | Time | Percent $Na_2O$ | Percent alpha |
|---|---|---|---|
| Kiln feed hydrate | 15 minutes | 1.11 | 73–77 |
| Do | 45 minutes | .007 | 85–85 |
| Do | 1 hour | .006 | 82–86 |
| Do | 1¼ hour | .004 | |
| Metallurgical alumina | 15 minutes | 1.06 | 84–88 |
| Do | 45 minutes | 1.02 | 85–89 |
| Do | 1 hour | 1.02 | 88–92 |
| Do | 1¼ hour | .008 | |

1 $Na_2O$ content determined by quicker method accurate only to about .02% lower limit; others determined by different method accurate to 0.01% lower limit.

While 2750° F. was used in previous tests, it seems that 2550° F. also yields good results, especially in soda removal. A slightly higher temperature would be needed for still higher alpha content of the final alumina, as shown in Table 10:

TABLE 10.—EFFECTS OF 5% OF 20 x 30 MESH ARKANSAS SALINE COUNTY QUARTZITE ON SODA REMOVAL AND ALPHA FORMATION AT 2550° F.

[Calcination temp., 2550° F.; retention time, 1½ hours]

| Name | Starting material | | Alumina product | |
|---|---|---|---|---|
| | Percent $Na_2O$ 1 | Percent alpha | Percent $Na_2O$ | Percent alpha |
| Kiln feed hydrate | 0.35 | | 0.09 | 75–79 |
| Metallurgical $Al_2O_3$ | 0.48 | 24–28 | 0.07 | 77–31 |
| Hard burned alumina | 0.30 | 85–89 | 0.06 | 88–92 |

1 $Na_2O$ on calcined basis.

The last two products were predominantly 2 microns or less; the first product had considerably more crystals below 1 micron than the others.

EXAMPLE 5

*Effect of water vapor or gas heat.*—The foregoing tests were performed in an electric furnace, but since gas heat would be used commercially the following tests were run with water vapor present, and with gas heat to determine any effects thereof. Firing for 1 hour in a gas-fired furnace with 5% Arkansas Saline County 20 x 30 mesh quartzite and unwashed metallurgical alumina, gave results shown in Table 11. Instead of virtually all granular or crudely spherical crystals from the electric furnace, this product contained also a substantial proportion of rod-shaped crystals, all 2 microns or less in diameter.

TABLE 11

| Firing temp., °F. | Before firing | | After firing | | | |
|---|---|---|---|---|---|---|
| | $Na_2O$, percent | Alpha, percent | $Na_2O$, percent | Alpha, percent | Flow rate | Loose bulk density, lbs./cu. ft. |
| 2,500 | 0.44 | 15–20 | 0.02 | 87–91 | 2 min., 31 sec | 60.2 |
| 2,300 | 0.44 | 15–20 | 0.28 | 78–82 | 3 min | 57.3 |

The use of alumina hydrate as kiln feed at 2400° F. for 1½ hours with 5% of 20 x 30 mesh Saline County, Arkansas, quartzite in the electric furnace with a constant flow into the furnace of steam superheated to 290° C. yielded alumina containing 0.03% $Na_2O$ and 87–91% alpha alumina, with the crystals preponderantly rod-shaped and predominantly 2 microns or less in size.

Thus, the novel process of this invention enables changing the shape of the alumina crystals from granular or crudely spherical, to substantially rod-shaped, by control of the firing conditions, principally the moisture content of the gas.

The use of gas heat or water vapor permits reduction of the effective temperature for securing the desired low-soda high alpha product to as low as 2400° F. and substantial soda reduction at as low as 2300° F.

Where quartzite is employed as the siliceous material, it is to be understood that this term refers to the crystal phase of silica existing at ordinary temperatures, i.e. quartzite is the stable phase of silica below 1598° F. At 1598°–2678° F., the stable phase is tridymite while above 2678° F. the stable phase is cristobalite. Thus the soda may actually react with either the tridymite or the cristobalite phases of silica at the temperature ranges employed in the method of this invention.

EXAMPLE 6

In a natural gas fired pilot plant 20″ x 25′ rotary kiln, there was produced 300 pounds per hour of typical .035% $Na_2O$, 91% alpha friable alumina from 10% of 16 x 30 mesh Arkansas Saline County quartzite admixed with metallurgical grade alumina containing .36% $Na_2O$. The discharge temperature was 2390° F. The product was preponderantly granular with some rod-shaped crystals and the bulk density was about 57 pounds per cubic foot. Retention time was about an hour.

*Effect of lower limits of calcination temperature.*—The effects of the lower limits of treatment temperature on removal of soda and upon conversion to alpha alumina are shown in Table 11a, showing treatment of kiln feed alumina hydrate with quartzite at 2100° F. and 2300° F.

TABLE 11a.—EFFECTS OF QUARTZITE ON REMOVAL OF SODA AND ALPHA CONVERSION FROM KILN FEED HYDRATE AT LOW CALCINATION TEMPERATURES (2100° F. AND 2300° F.)

| Starting product and treatment | Fired $Al_2O_3$ product | |
|---|---|---|
|  | $Na_2O$, percent | Alpha, percent |
| Starting kiln feed hydrate (control) | ¹ 0.40 | (²) |
| Kiln feed hydrate; 10% (by weight calcined basis) 10 x 14 mesh quartz, 1 hour at— |  |  |
| 2,100° F. | 0.36 | Trace |
| 2,300° F. | 0.25 | 80–85 |

¹ Calcined basis.  ² Does not apply.
NOTE.—Firing was performed in platinum dishes. Samples were put in cold muffle and brought to desired temperature in approximately 2½ hours. After 1 hour firing, furnace was allowed to cool and the quartzite was removed by screening on a 35 mesh screen.

It will be seen from Table 11a that a temperature of 2100° F. is effective in reducing soda content of the alumina, but that a temperature of 2300° F. is desirable to produce a somewhat lower soda content alumina, which is friable and which possesses a high alpha content of 80–85%.

Properties of Friable Alumina

The alumina produced by the method of this invention possesses exceptional properties of friability, good shrinkage properties, high flowability, and high bulk density. The friability results in reduced milling costs and increased capacity of milling facilities. Friability is indicated by comparative tests of grindability. In a typical test the starting materials were each screened and composited to a size range comprising: +100 mesh 13.5%, 100–200 mesh 64.3%, 200–325 mesh 21.0%, minus 325 mesh 1.2%. After thorough mixing, 10 gm. portions were taken separately and mixed with 10 ml. portions of isopropyl alcohol and each was ground 35 minutes in a mechanical mortar and pestle. The friable alumina was compared to boric acid treated alumina because the latter is a typical commercially available low soda, high alpha ceramic alumina. The resulting slurries were dried, mixed thoroughly, and particle size was determined by the standard Andreasen pipette method. The results are shown in Table 12:

TABLE 12.—RELATIVE GRINDABILITY OF FRIABLE ALUMINA AND LOW SODA BORIC ACID TREATED ALUMINA

| Sample | Size distribution (microns) (weight basis) | | | | | | |
|---|---|---|---|---|---|---|---|
|  | +30 | −30+20 | −20+10 | −10+5 | −5+2 | −2+1 | −1 |
| Boric acid treated | 13.4 | 5.1 | 13.8 | 30.0 | 32.3 | 4.1 | 1.3 |
| Friable (per Example 1) | 16.7 | 3.9 | 8.6 | 9.9 | 36.7 | 19.8 | 4.4 |

After 35 minutes' grinding, the minus 2 micron material in the boric acid treated alumina was only 5.4%. In the case of the friable alumina of this invention, the minus 2 micron portion was 24.2% or nearly five times as great as in the case of the boric acid treated material.

The friable alumina of the present invention also exhibits substantially different shrinkage properties and higher fired densities than known low soda high alpha aluminas. The much higher density seemingly could be largely the result of the wedging together, upon cooling, of the alumina particles present in a wide range of particle sizes. It is well recognized that the higher the density of a ceramic product, the greater in flexural strength it normally becomes. The flexibility of movement inherent in a wide particle size distribution range also tends to reduce excessive distortion or warping of the ceramic product during firing and cooling. Table 13 provides a comparison of shrinkage properties of quartzite treated friable alumina produced in accordance with Example 1, with a boric acid treated alumina, designated as Sample 2, and with two low soda aluminas commercially available and designated as Samples 3 and 4.

TABLE 13.—COMPARISON OF SHRINKAGE OF VARIOUS ALUMINAS

|  | Shrinkage at 2,912° F. | | | |
|---|---|---|---|---|
|  | Unground basis | Final density, g./cc. | −325 mesh ground basis | Final density, g./cc. |
| (1) Friable alumina (0.02% $Na_2O$) | 11.4 | 2.80 | 14.5 | 3.24 |
| (2) Boric acid treated alumina (0.099% $Na_2O$) | 1.8 | 2.10 | 6.4 | 2.80 |
| (3) Commercial product (0.06% $Na_2O$) |  |  | 6.0 | 2.56 |
| (4) Commercial product (0.04% $Na_2O$) | 1.6 | 2.10 | 7.2 | 2.51 |

In the foregoing table, the test data on shrinkage were obtained by pressing an 8 gm. sample in a 1 inch diameter die at 12,725 pounds per sq. inch to form a pellet. The pellet was placed in a cold furnace, heated to 2912° F. during 1 hour and held at this temperature for 1 hour. The pellet was removed after the cooling of the furnace and the diameter was measured to determine the percentage shrinkage. It is apparent from Table 13, that the friable alumina produces a much denser fired body than the other low soda aluminas, both on the ground and the unground basis. This is most important because higher obtainable density means more solid per unit volume, and thus more strength in the finished product as a consequence. Table 13 shows the compressed pellets of friable alumina to have much greater shrinkage upon cooling after firing, than do the other types of low-soda alumina. This greater shrinkage might be expected from the much greater density because there is less air within the structure to accommodate expansion and contraction, more of which must go externally and thus be measured. The higher shrinkage in this case thus is a reflection of desirable greater density and strength. In spark plug manufacture the compounded friable alumina fired to 3.85 g./cc. density versus 3.60–3.70 g./cc. for other low-soda, high alpha aluminas, and yielded the strongest product tested.

However, it is highly significant that friable alumina, when incorporated into a conventional mixture for sintering, 5% kaolin and 5% talc by weight, grinding in a dry ball mill for 10 hours, and pressing into a 1″ diameter cylinder at 4,000 p.s.i., gave relatively low shrinkage when fired for 1 hour at 3000° F., as shown in Table 14:

TABLE 14.—SHRINKAGE BY FIRING AT 3000° F. FOR 1 HOUR

| Alumina designation | Approximate particle size | Shrinkage, Percent |
| --- | --- | --- |
| Friable alumina | 90% 2 micron and less | 15.8 |
| Boric acid treated, less than 0.10% $Na_2O$. | 2–10 micron | 15.8 |
| Commercial product, less than 0.10% $Na_2O$. | 4–15 micron | 15.4 |
| Commercial product, less than 0.05% $Na_2O$. | 2–10 micron | 17.7 |

Another advantage of the friable alumina of this invention is found in its high flowability. This property is tested by determining the time required for 100 gm. to flow through a special stemless funnel with a ³⁄₃₂ inch opening, a 3½ inch cone base and a 10 inch cone height, with a 20° included angle. The friable alumina of this invention flows more freely than ordinary commercial hard-burned ceramic grade alumina, or than a boric acid treated low-soda alumina, or than a commercial grade special hard burned ceramic alumina. The comparative results of flow test on these products are shown in Table 15:

TABLE 15.—COMPARATIVE FLOWRATES OF FRIABLE AND OTHER ALUMINAS

| Alumina sample | Screen analysis | | | | Flow time, min.:sec. |
| --- | --- | --- | --- | --- | --- |
| | +100 | 100/200 | 200/325 | −325 | |
| (1) 0.35–0.50% $Na_2O$ special hard burned ceramic alumina | 7.9 | 79.6 | 12.2 | 0.3 | 2:34 |
| (2) Friable alumina according to Ex. 1 | 7.9 | 79.6 | 12.2 | 0.3 | 2:28 |
| (3) Hard burned ceramic grade 0.3–0.4% $Na_2O$ | 13.4 | 73.7 | 12.4 | 0.5 | 3:26 |
| (4) Boric acid treated alumina | 10.0 | 59.4 | 27.6 | 3.0 | 2:49 |

The table indicates that, among products having generally the same particle size distribution, the friable alumina flowed in 2 minutes and 28 seconds, or substantially less than any other type. This means that it is capable of being more easily handled and proportioned in manufacturing process.

The friable alumina of this invention made in an electric furnace or in a relatively dry atmosphere also has a bulk density as high or higher than that of other known low soda ceramic aluminas. This assures maximum charge capacity by weight, in ball mills, bins, transportation, and carrying equipment. The forms produced by direct gas heat or in a high-humidity atmosphere have lower bulk density. The comparative loose bulk densities of the friable alumina and other low soda aluminas are shown in Table 16.

TABLE 16.—COMPARATIVE BULK DENSITIES OF FRIABLE AND OTHER ALUMINAS

Alumina sample: Loose bulk density (lb./cu. ft.)
Friable _____ 63.3
Hard burned ceramic grade _____ 56.4
Boric acid treated _____ 55.3

The siliceous material which is to be used in the method of this invention is one which is capable of combining with soda, i.e. a material in which any soda content previously present is not so great as to render the material inactive for soda absorption.

It is well known that soda combines in the alumina crystal lattice to make a beta alumina crystal phase (11–12 mols $Al_2O_3$:1$Na_2O$). This invention results in the removal of soda to prevent formation of or to break up the beta alumina, thus permitting ready formation of alpha alumina. It is therefore a process for removal of soda in a most simple, effective, and economical way. But it is also a process for production of a unique product with unusually useful properties such as small crystal size, ready alpha development, high density and strength of sintered products, and friability. It also possesses versatility with respect to crystal shape.

While there have been illustrated and described present preferred embodiments of the invention, it will be recognized that the invention may be otherwise variously embodied and practiced within the scope of the following claims.

What is claimed is:
1. Method for reducing the soda content of alumina which comprises heating soda-containing alumina in the presence of a solid, inorganic silica-containing material which is capable of combining with soda while remaining in the solid phase, at a temperature between about 2300° F. and about 2800° F., to form a solid, soda-containing compound of said material, and recovering the treated alumina.

2. Method for reducing the soda content of alumina which comprises admixing with soda-containing alumina a solid, inorganic silica-containing material which is capable of combining with soda while remaining in the solid phase, heating the mixture at a temperature above 2100° F. but below the softening temperature of said silica-containing material to form a solid, soda-containing compound of said material, and recovering the treated alumina.

3. The method of claim 2, in which the silica-containing material contains from about 10% to substantially 100% by weight of silica.

4. The method of claim 2, in which the silica-containing material is in the form of quartzite prior to the heating step.

5. The method of claim 2, in which the silica-containing material is sintered alumina containing about 10% by weight of silica.

6. The method of claim 2, in which the silica-containing material is sillimanite.

7. The method of claim 2, in which the silica-containing material is nepheline syenite.

8. The method of claim 2, in which the proportion of the silica-containing material is between about 3% and about 10% by weight.

9. The method of claim 2, in which the heating is carried out for a period between about ½ to 2 hours.

10. The method of claim 2, in which the particle size of the alumina ranges between about 50 and about 325 mesh.

11. The method of claim 2, in which the alumina is in the form of alumina hydrate.

12. The method of claim 2, in which the silica-containing material is an alumina silicate.

13. The method of claim 2, in which the soda-containing alumina is the product obtained by calcining alumina hydrate.

14. The method of claim 2 in which at least a portion of the silica-containing material admixed with the alumina is soda-containing silica-containing material separated from said treated alumina.

15. Method for reducing the soda content of alumina which comprises admixing the soda-containing alumina with discrete particles of a solid, inorganic silica-containing material which is capable of combining with soda, said material retaining its particulate form upon being heated to the temperature necessary for combining with soda in the alumina, heating the mixture at a temperature above 2100° F. but below the softening temperature of said silica-containing material, to form a solid, soda-containing compound of said material, and separating said compound and any unreacted silica-containing material from the treated alumina.

16. The method of claim 15, in which the treated alumina is separated from silica-containing material by screening.

References Cited in the file of this patent

UNITED STATES PATENTS

| | | |
|---|---|---|
| 1,282,222 | Hall et al. | Oct. 22, 1918 |
| 1,950,883 | Gitzen | Mar. 13, 1934 |
| 1,966,406 | Hauman | July 10, 1934 |
| 2,411,806 | Risenmeyer et al. | Nov. 26, 1946 |
| 2,535,659 | Wolff | Dec. 26, 1950 |
| 2,887,361 | Fenerty | May 19, 1959 |